A. SHARP.
PNEUMATIC SPRING.
APPLICATION FILED MAR. 14, 1914.
1,107,714.
Patented Aug. 18, 1914.
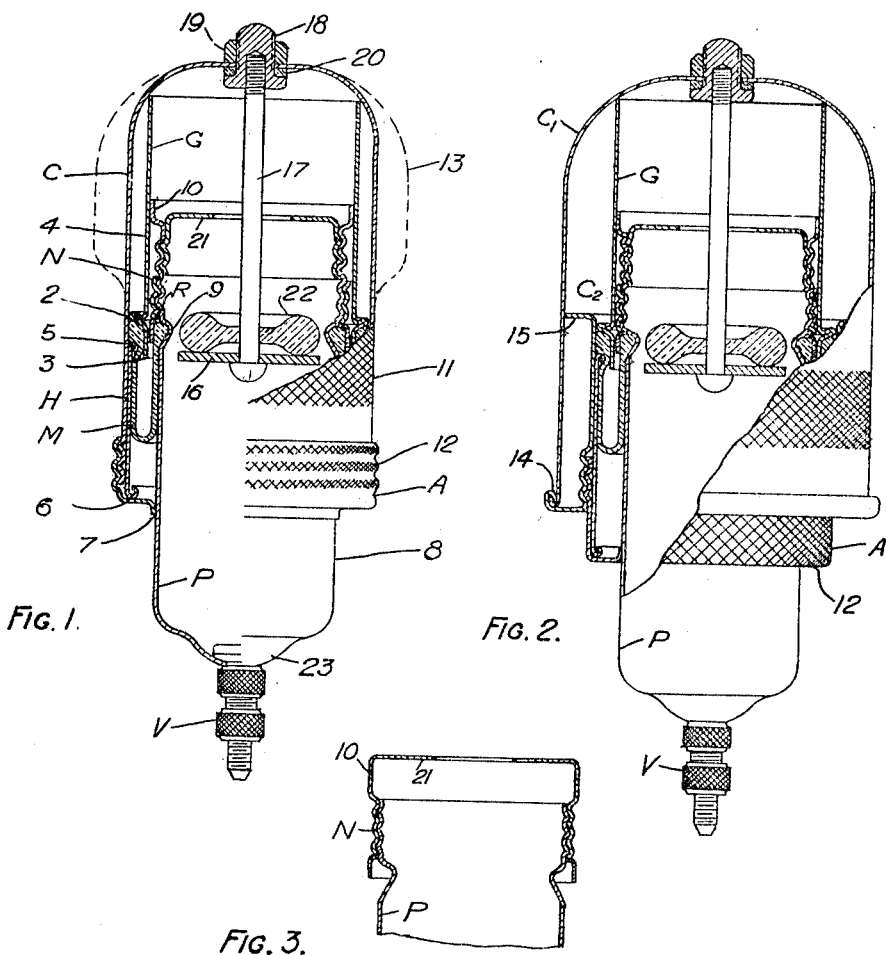
Attest:
Ewd L. Tolson
H. L. Alden
Inventor:
Archibald Sharp
By Spear, Middleton, Donaldson & Spear
Attys.

UNITED STATES PATENT OFFICE.

ARCHIBALD SHARP, OF LONDON, ENGLAND.

PNEUMATIC SPRING.

1,107,714.  Specification of Letters Patent.  Patented Aug. 18, 1914.

Application filed March 14, 1914. Serial No. 824,838.

*To all whom it may concern:*

Be it known that I, ARCHIBALD SHARP, subject of Great Britain, residing at 231 Strand, London, W. C., England, have invented certain new and useful Improvements in Pneumatic Springs, of which the following is a specification.

This invention relates to improvements in pneumatic springs of the type in which compressed air is pumped into a reservoir formed by a cylinder and hollow plunger each closed at one end and an air tight joint is obtained by the use of a rolling packing mitten which is extensible radially. The said improvements relate to the methods of arranging and making the parts, including those for holding the edges of the rolling packing mitten in air tight contact with the cylinder and plunger, whereby greater security and facility for fastening the mitten is obtained, the parts may be made from thin metal in the form of sheet or tube, and the working parts may be protected from accidental damage by rough usage.

Figure 1 is a drawing partly in section, showing the invention in its simplest form. Fig. 2 is a drawing showing a spring having the same length and load supporting capacity for a given pressure of air as that shown in Fig. 1, but having greater resiliency. Fig. 3 is a modification of a detail.

The cylinder C and the plunger P may each be made in one piece drawn from sheet metal or electrically deposited, or they may each be made from tube with the end fastened air-tight by rolling, beading, brazing, soldering, or any other convenient method. A loose tubular liner G, is placed inside the cylinder and serves as a guiding surface for the inner end of the plunger. A hole is drilled in it, or its inner end is notched, so that the compressed air may pass freely. For the purpose of locating it coaxial with the cylinder, a ridge or flange 2 which fits easily inside the cylinder is rolled on it, while its inner end bears against the end of the cylinder, the contact surface of which is rounded or conical.. The outer end 3 of the liner is of the same diameter as its middle part 4. A distance piece or mitten holder H fits easily inside the outer end of the cylinder; its inner end or mouth 5, which is suitably shaped for the purpose, presses against the larger thickened end of the rolling packing mitten M, squeezing the said thickened end between the cylinder wall and the end of the liner G. To facilitate its withdrawal from the cylinder, the mitten holder may have its outer end curled inward as at 6. A cap A is screwed to the outer end of the cylinder, and is so shaped that it forms a guide at 7 for the plunger. The screw threads on both the cylinder and the cap are preferably rolled, so that the cylinder and cap may be of thin metal. When the cap is screwed up tight on the cylinder, the mitten holder H, the larger thickened end of the mitten, and the liner G are all pressed tightly together, while the end of the mitten is forced outward against the wall of the cylinder making an air-tight joint therewith.

The plunger P is made with its normal external diameter at 8 as much less than the internal diameter of the mitten holder as is required to allow the mitten space to roll freely from one surface to the other. A groove 9 is rolled on it to receive the smaller thickened end of the mitten M, while its inner end 10 is expanded to make an easy sliding fit in the liner G. The smaller thickened end of the mitten is retained on the plunger by the ring R, which is forced downward by the nut N, squeezing the mitten against the groove of the plunger, thereby forming an air tight joint. The nut N has its core diameter slightly larger than the diameter of the plunger at 8, and is screwed on the plunger, the threads on the latter being preferably rolled.

The cylinder may be knurled at 11 and the cap may be knurled at 12, for the purpose of obtaining a good hand grip for screwing up and unscrewing. A valve V is fastened to the closed end of the cylinder or plunger, coaxially with the said cylinder or plunger in the manner usual with pneumatic tires.

If a pneumatic spring is required of the same effective diameter and length as that shown in Fig. 1, but containing a larger volume of compressed air, part of the cylinder may be made of larger diameter as shown by the dotted lines 13. A modified form of construction is shown in Fig. 2, in which the cylinder is made in two parts $C_1$ and $C_2$ suitably fastened together air tight at 14, the outer part $C_1$ being of larger diameter to contain a large volume of air, the inner part $C_2$ inside which the mitten holder fits, being flanged outward at 15 to form an easy fit on the inner part $C_1$. The flange of the liner G is an easy fit inside the inner part $C_2$.

In some cases the article on which the pneumatic spring is used (for example, the spring fork of a motor bicycle) is provided with a stop which limits the movement of the plunger outward from the cylinder, thus preventing any undue stress on the rolling packing mitten. In other cases I may provide an internal stop, one member of which may be formed by a washer 16 fastened to the end of a central rod 17 the other end of which is detachably fastened to the end of the cylinder or plunger by means of the nipple 18, nut 19 and air tight washer 20; the other member of the stop is a washer 21 screwed to the plunger P and pierced with a hole through which the central rod 17 passes, a rubber buffer 22 being interposed between the washers 16 and 21. The end of the nipple 18 is made with a spherical surface, and the end of the plunger may be made with a spherical surface at 23 or a separate washer may be inserted between the plunger end and the valve stem, the said washer having a spherical surface. The said surfaces fit into corresponding spherical sockets on the parts against which they press. In this way the forces exerted by the pneumatic spring at its two ends, will be coaxial, and there will be little or no lateral pressure on the guiding surfaces 7 and 10.

Fig. 3 shows a modification in which the stop washer 21 and nut N are combined in one piece, which is expanded at 10 to form a working fit in the liner G.

To assemble the pneumatic spring, the nut N is screwed back on the plunger until the ring R is clear of the groove on the plunger. The smaller thickened end of the mitten is laid in the groove, the ring R slipped over it, and the nut N screwed down on the ring. The mitten is folded on the plunger as shown in Fig. 1, the liner G and mitten holder H placed on the plunger and in contact with the larger thickened end of the mitten. The internal stop being in position on the plunger, the parts are then inserted bodily in the cylinder, and the nut 19 and the cap A are screwed up tight. Air may then be pumped in through the valve.

From the foregoing description it will be seen that the outside surface of the cylinder may be dented, without any injury being transmitted to the liner G in which the plunger P slides. The rolling of the screw threads on the metal parts permits those parts to be made from much thinner metal than if the screw threads were cut. The mode of fastening of the thickened edges of the mitten to the cylinder and plunger respectively gives greater security and facility for obtaining air tight joints therewith, than has been the case formerly.

Claims:

1. A pneumatic spring comprising in combination, a cylinder C and plunger P, each closed at one end, a tubular flanged liner G, a mitten M, a mitten holder H, a cap A screwed to the open end of the cylinder, a ring R, a nut N screwed on the plunger, and a valve V coaxial with the cylinder or plunger, the plunger being adapted to slide on the liner G and cap A.

2. A pneumatic spring comprising in combination a cylinder C and plunger P, each closed at one end, a tubular flanged liner G, a mitten M, a mitten holder H, a cap A screwed to the open end of the cylinder, a ring R, a nut N screwed on the plunger, a valve V coaxial with the plunger, and an internal stop made of a rod 17 and washer 16 fastened to the cylinder, a washer 21 fastened to the plunger, and a rubber buffer 22.

3. A pneumatic spring comprising in combination, a cylinder made of an outer part $C_1$ of large diameter and an inner part $C_2$ of less diameter, a mitten M, a mitten holder H fitting easily inside the said part $C_2$, a liner G with a flange fitting easily inside the said part $C_2$, a cap A, a plunger P, ring R, nut N, and valve V.

In testimony whereof, I affix my signature in presence of two witnesses.

ARCHIBALD SHARP.

Witnesses:
JNO. MASTERTON,
WILLIAM R. SHARP.